United States Patent [19]
Jaggard

[11] Patent Number: 6,149,105
[45] Date of Patent: *Nov. 21, 2000

[54] DEPLOYMENT MECHANISMS FOR AIRCRAFT AUXILIARY AIRFOILS

[75] Inventor: Philip R. Jaggard, Bristol, United Kingdom

[73] Assignee: British Aerospace Public Limited Company, Farnborough, United Kingdom

[*] Notice: Under 35 U.S.C. 154(b), the term of this patent shall be extended for 204 days.

[21] Appl. No.: 08/703,435

[22] Filed: Aug. 26, 1996

[30] Foreign Application Priority Data

Aug. 26, 1995 [GB] United Kingdom .................. 9517556

[51] Int. Cl.$^7$ ........................................................ B64C 9/22
[52] U.S. Cl. .......................................... 244/214; 244/216
[58] Field of Search ................................. 244/214, 216, 244/218, 213

[56] References Cited

U.S. PATENT DOCUMENTS

| | | | |
|---|---|---|---|
| 1,917,428 | 7/1933 | Burnelli | 244/214 |
| 4,471,928 | 9/1984 | Cole | 244/216 |
| 4,475,702 | 10/1984 | Cole | 244/214 |
| 5,544,847 | 8/1996 | Bliesner | 244/216 |

FOREIGN PATENT DOCUMENTS

| | | |
|---|---|---|
| 045987A1 | 7/1981 | European Pat. Off. . |
| 045988A1 | 7/1981 | European Pat. Off. . |
| 227643A2 | 7/1981 | European Pat. Off. . |
| 230681A2 | 8/1986 | European Pat. Off. . |
| 291328A2 | 5/1988 | European Pat. Off. . |
| 414531A2 | 8/1990 | European Pat. Off. . |
| 501831A1 | 2/1992 | European Pat. Off. . |
| 319983 | 10/1929 | United Kingdom . |
| 2213113A | 9/1989 | United Kingdom . |
| WO95/13214 | 5/1995 | WIPO . |

*Primary Examiner*—Peter M. Poon
*Assistant Examiner*—Tien Dinh
*Attorney, Agent, or Firm*—Nixon & Vanderhye P.C.

[57] ABSTRACT

A deployment mechanism for moving an aircraft wing leading edge slat (2) or trailing edge flap (4) relative to a main airfoil (1) is provided. The mechanism includes an I-section support beam (6) extending between the main airfoil (1) and the slat (2) or flap (4). The support beam (6) is driven into and out of the main airfoil (1) by a rack and pinion mechanism (22, 23), the rack (22) being disposed along a lower boom (20) of the beam (6) and the beam (6) being supported for rolling contact with the main airfoil (1) by upper and lower straddle rollers (8, 9, 10, 11) positioned between wing leading edge ribs (12, 13). Roller tracks (16, 17, 18) extend along upper and lower booms (19, 20) of the beam with at least one roller track (17, 18) co-extending with the rack (22) adjacent thereto along the beam.

8 Claims, 2 Drawing Sheets

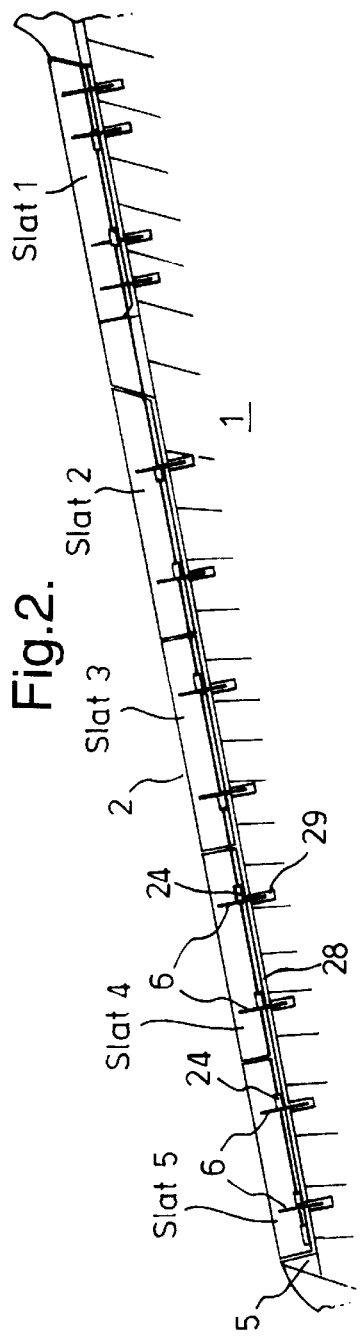
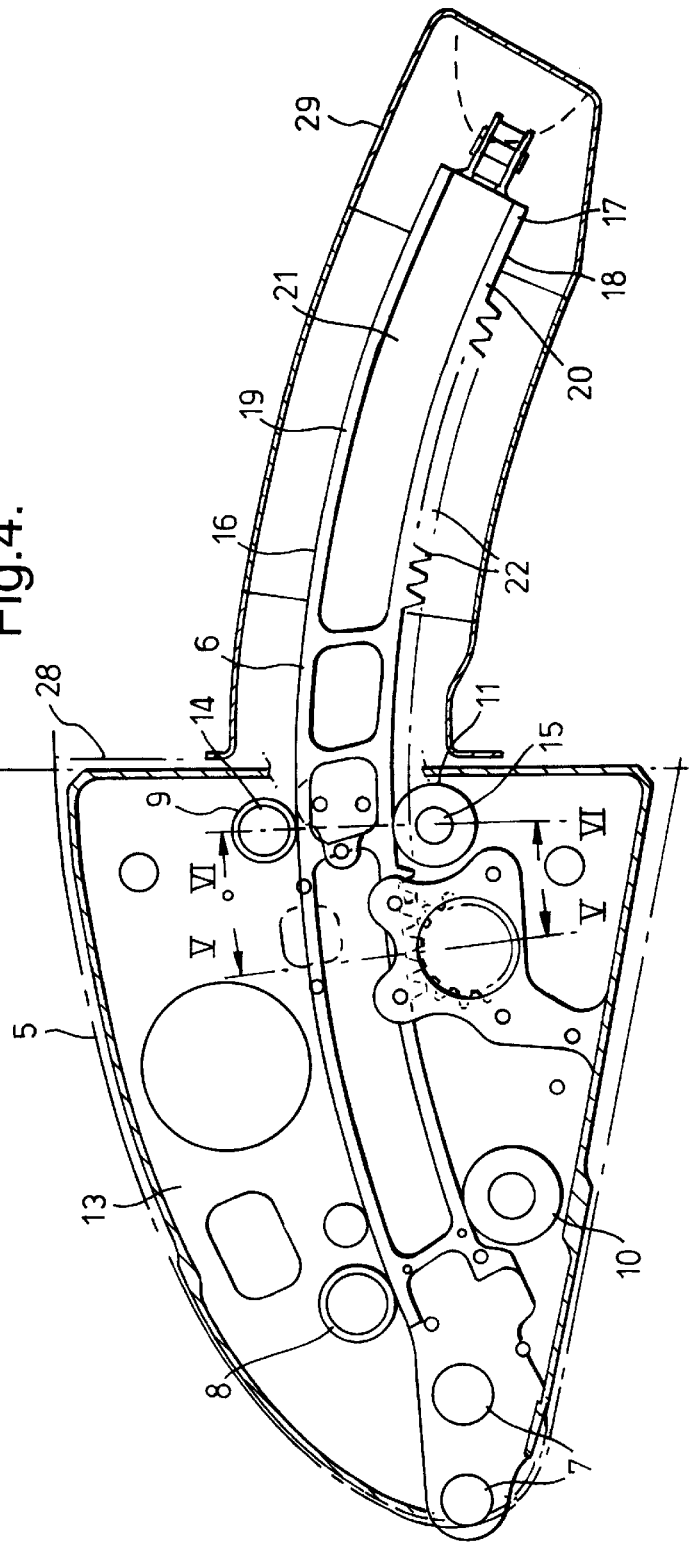

DEPLOYMENT MECHANISMS FOR AIRCRAFT AUXILIARY AIRFOILS

BACKGROUND TO THE INVENTION

This invention relates to deployment mechanisms for moving aircraft auxiliary airfoils such as leading edge slats or trailing edge flaps relative to main airfoils. In particular the invention relates to such mechanisms which include support beams extending between auxiliary and main airfoils in which the beam is driven by a rack and pinion arrangement.

DESCRIPTION OF PRIOR ART

It is well known to modify the lift of an aircraft main aerofoil when the aircraft is moving at lower speeds, for example during take off and approach or landing, to delay the point at which wing stall occurs. Auxiliary airfoils are used for this purpose which are moveable between a retracted or cruise position closely adjacent to the main airfoil where minimum aerodynamic drag is created and at least one deployed position spaced from the main airfoil when modified wing lift is created.

Various types of deployment mechanism for moving the auxiliary airfoil as described above are known. A popular type of mechanism employs at least two support beams per auxiliary airfoil which extend between auxiliary and main airfoil. The support beams will be fixed to one or other of the auxiliary and main airfoil, usually the former, at one end of the beam. The beam is movably connected over its length to the other of the two airfoils, normally the main airfoil, by a series of rollers mounted on the airfoil for rolling engagement with tracks on the support beam.

One such deployment mechanism which uses a rack and pinion arrangement to effect movement is known from U.S. Pat. No. 1,917,428-Burnelli. This document discloses the use of a rack and pinion mechanism for deploying both wing leading edge and trailing edge lift modifying devices (hereafter called "auxiliary airfoils", for the purposes of this application). The leading edge mechanism employs a beam with an I-shaped cross section with upper and lower booms and a web interconnecting them with a rack being formed integral with an upper surface of the beam. A drive pinion is rotatably mounted on a main airfoil for engagement with the rack. The beam is fixedly supported at one end to an auxiliary airfoil and runs on support rollers along its length for support by the main airfoil. In this arrangement the beam is supported by a pair of upper and lower straddle rollers which act upon rolling tracks formed on upper and lower booms of the I-beam respectively. The straddle rollers are bolted to a front spar of the main airfoil and the beam is deployable in a space confined between adjacent wing ribs of the main airfoil. In order not to interfere with the rolling track for the upper straddle roller the rack is truncated immediately aft of the upper straddle roller when the auxiliary airfoil is in its fully forwardly deployed position.

Owing to the rack forming a toothed surface in the upper boom of the I-beam rearwardly of the straddle rollers, an upper rear roller for supporting the I-beam could not be mounted on the main airfoil for contact with an upper surface of the I-beam owing to the lack of a smooth upper rolling track because of the presence of the rack. Rear mounted upper and lower rollers were therefore rotatably attached to a rear end of the I-beam for engagement with upper and lower fixed rolling tracks attached to the main airfoil. The I-beam was therefore deployable whilst being supported by the forward pair of straddle rollers rotatably attached to the forward spar of the main airfoil and by two rearward pairs of cantilever rollers rotatably attached to the rear end of the I-beam.

In order to provide an adequate "roller base", ie a fore and aft separation of forward and rearward rollers, when the I-beam was fully deployed forwardly and therefore subject to maximum aerodynamic loads, it was necessary to have an excessively long I-beam so that the roller base in the rearward end of the I-beam protruding below the main airfoil, within a fairing, when the auxiliary airfoil was fully retracted. The result was excessive weight with an added aerodynamic penalty. In addition, in a modern aircraft, fuel carrying space within the main airfoil would be compromised. This design also necessitated the provision of four individual tracks on the main airfoil for the rear rollers, a complex and expensive solution for this requirement.

SUMMARY OF THE INVENTION

It is an object of the invention to provide a simpler, more efficient and more compact deployment mechanism than exhibited by the prior art.

According to the present invention there is provided a deployment mechanism for moving an aircraft auxiliary airfoil such as a leading edge slat or a trailing edge flap relative to a main airfoil, the mechanism including a support beam extending between auxiliary and main airfoils, the beam having an I-shaped cross section with upper and lower booms and a web interconnecting them with a rack being formed integral with a surface of one of the booms for engagement with a drive pinion rotatably mounted on the main airfoil, and at least two support rollers for the beam rotatably mounted on the main airfoil for rolling engagement with roller tracks extending along upper and lower surfaces of the beam, said at least two support rollers being mounted to straddle an adjacent pair of structural members of the main airfoil between which the beam is supported, characterised in that all the support rollers are rotatably mounted on the main airfoil to straddle said adjacent pair of structural members for rolling engagement with the roller tracks extending along upper and lower surfaces of the beam and at least one roller track co-extends with the rack adjacent thereto, along the beam.

A compact, light, robust and easily adjustable mechanism is thus provided. The lower surface of the beam preferably includes the said rack centrally disposed between a pair of roller tracks co-extending on either side thereof. Symmetry is thus given to the mechanism.

Each lower roller may have laterally separated rolling surfaces, ie rolling surfaces separated in a horizontal direction normal to the longitudinal axis of the beam, whereby to engage the said pair of roller tracks on either side of the rack whilst providing clearance for the rack between the laterally separated rolling surfaces.

The laterally separated rolling surfaces may be integrally formed as part of a single roller or each lower roller may comprise a pair of divided rollers with each having a said laterally spaced rolling surface thereon. The single roller version may be more rigid but divided rollers may provide easier assembly in certain circumstances.

In any event it will be appreciated that the roller or divided roller will be rotatably mounted on a single axle extending between the adjacent pair or structural members of the main airfoil.

The rack may stand proud of at least one said roller track, in which case the clearance provided by the rolling surfaces will allow for vertical clearance of the rack between the rolling surfaces as well as lateral clearance. If for example the rack, whilst being formed integrally with the beam, were nevertheless recessed from roller tracks on the beam, then rolling surfaces on the roller need not have any radially extending cut-out between them to accommodate the rack.

BRIEF DESCRIPTION OF THE DRAWINGS

The invention will now be described by way of example with reference to the accompanying drawings of which:

FIG. 2 is a plan view of a wing leading edge showing leading edge slat disposition spanwise along the wing together with slat support by pairs of beams, FIG. 4 is a vertical section chordwise through a wing leading edge showing a mechanism according to the invention.

DESCRIPTION OF PREFERRED EMBODIMENT

Figure 1:
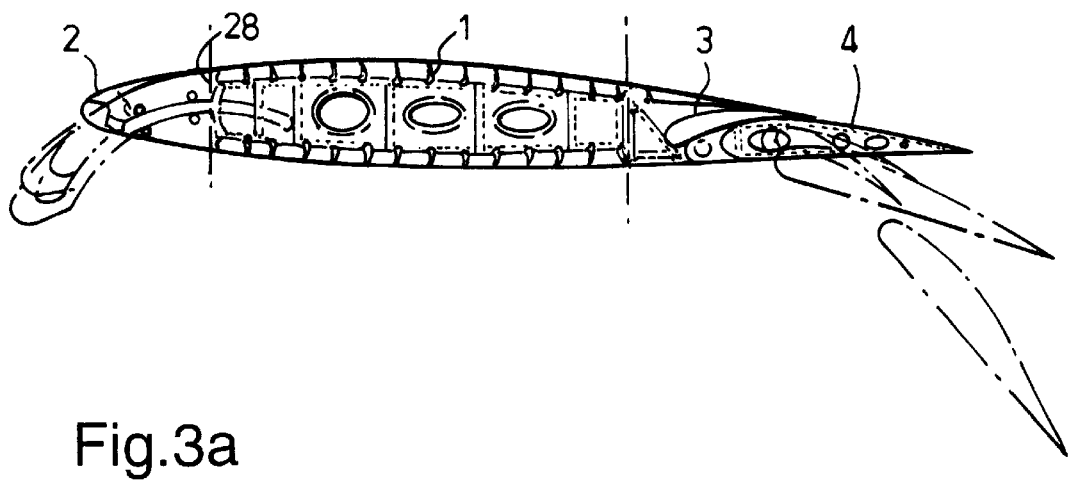
FIG. 1 is a vertical section through an aircraft wing showing deployment movement of front and rear auxiliary airfoils in relation to a main airfoil.

Referring to the drawings, FIG. 1 shows in a chordwise section an aircraft wing having a main airfoil or wing box 1 to which are movably attached auxiliary airfoils in the form of a leading edge slat 2 and trailing edge flaps 3 and 4. Both slat 2 and flaps 3, 4 are movable between stowed or cruise positions shown in normal outline and at least two deployed positions shown in chain dotted line.

This document will concentrate on a mechanism for deploying a leading edge slat and the remaining figures of the drawings illustrate slats and their operating mechanisms.

Figure 3A:
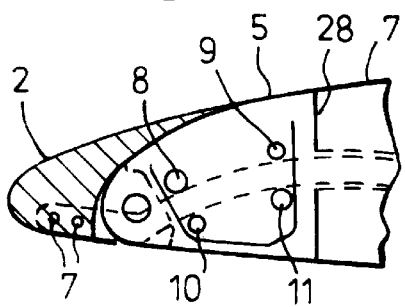
FIG. 3a is a vertical detail section through a wing leading edge showing a leading edge slat in a retracted position.
Figure 3B:
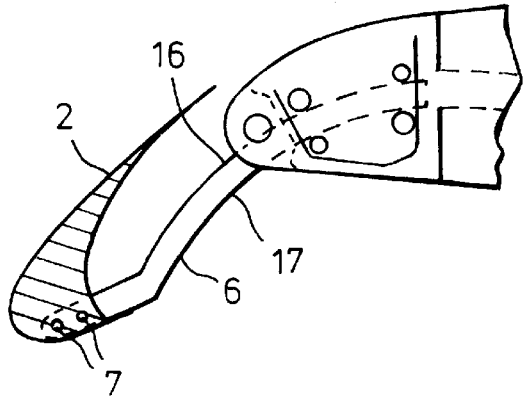
FIG. 3b shows the slat in an extended or deployed position.
Figure 5:
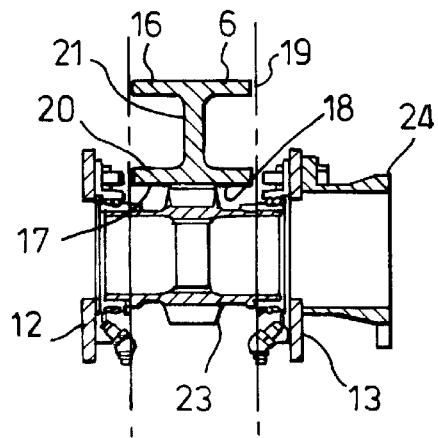
FIG. 5 is a section taken along the line V—V of FIG. 4.

FIG. 3a shows the slat 2 in its retracted or cruise position and FIG. 3b shows the slat in its extended or fully deployed position. A number of intermediate positions may be available according to flight requirements.

Figure 6:
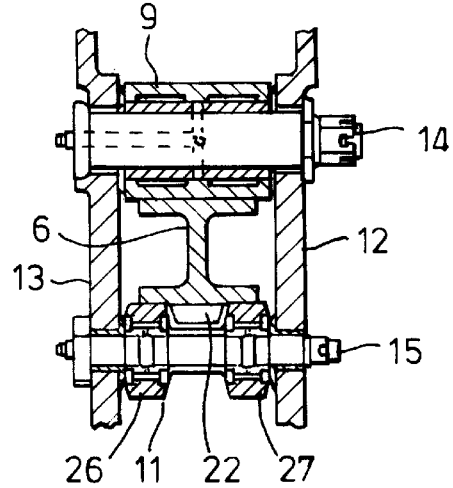
FIG. 6 is a section taken along the line VI—VI of FIG. 4.

Referring to FIGS. 3a, 3b and 4 in particular, the slat 2 is supported with respect to the main airfoil 1 by means of an I-section beam 6. The beam 6 is affixed at one end to the slat 2 by means of fasteners 7. The beam, and thereby the slat 2, are supported by the main airfoil 1 by four straddle rollers 8, 9, 10, 11. The straddle rollers are rotatably mounted on the main airfoil 1 between an adjacent pair of wing ribs 12, 13 upon axles 14, 15 passing therethrough (see in particular FIG. 6). The rollers 8, 9, 10, 11 run on roller tracks 16, 17, 18, of the beam 6 to support it during extension and retraction movement and to withstand all aerodynamic loads imposed on the slat 2 save those imposed in an extension or retraction direction.

The beam 6 comprises an upper boom 19 and a lower boom 20 separated by a web 21. On a lower surface of the lower boom 20 is integrally formed therewith a gear rack 22 which stands proud of the lower surface of the boom 20. The rack 22 engages a drive pinion 23 connected via a reduction gear box 24 (see FIG. 2) to torque shafting 25 (see FIG. 2) which transmits drive to the pinion from a drive motor (not shown) located in the wing or in the fuselage of the aircraft.

The rack 22 is centrally disposed on the lower boom 20 of the beam and is flanked by lower roller tracks 17, 18 which co-extend therewith adjacent to it.

Lower rollers 10, 11 have laterally separated rolling surfaces 26, 27 to provide clearance for the rack 22. The rollers 10, 11 are in fact single piece items although a vertically split roller with rolling surfaces 26, 27 formed on separately rotatable hubs would be feasible where required.

The beam 6 extends rearwardly of a forward spar 28 inside a sealed container called a track can 29. It will be observed that the overall length of the beam 6 is considerably shorter than that shown in the prior art embodiment causing minimal intrusion into a fuel tank area contained behind the front spar 28.

The arrangement as shown is extremely compact and strong. Adjustability of the rollers for rigging the slat is relatively straightforward in comparison with the prior art embodiment and the provision of the roller tracks 17, 18 either side of the rack 22, provides a compact, symmetrical and inherently strong arrangement with low potential maintenance being required.

Straddle rollers, as provided in this invention are inherently more stable than cantilever rollers, as shown at the rear of the beam in the prior art embodiment. The particular roller arrangement shown in the illustrations is symmetrical about a central axis of the beam 6 and the lateral spacing of the rolling surfaces 26, 27 of the lower rollers provides a stable support for the beam 6.

What is claimed is:

1. A deployment mechanism for moving an aircraft auxiliary airfoil relative to a main airfoil, said mechanism including:

a support beam extending between said auxiliary and said main airfoils, said beam having an I-shaped cross section with an upper and a lower boom and a web interconnecting said booms with a rack being formed integral with a surface of one of said booms;

a drive pinion rotatably mounted on said main airfoil for engagement with said rack; and at least two support rollers for said beam rotatably mounted on said main airfoil for rolling engagement with roller tracks extending along upper and lower surfaces of said beam, said at least two support rollers being mounted to and located between an adjacent pair of structural members of said main airfoil between which said beam is supported, wherein said support rollers are rotatably mounted on said main airfoil for rolling engagement with said roller tracks extending along upper and lower surfaces of said beam and at least one roller track co-extending with said rack adjacent thereto, along said beam.

2. A deployment mechanism as in claim 1 in which said lower surface of said beam includes said rack centrally disposed between a pair of said roller tracks co-extending with said rack on either side of said rack.

3. A deployment mechanism as in claim 2 in which each lower roller has laterally separated rolling surfaces whereby to engage said pair of roller tracks on either side of said rack whilst providing clearance for said rack between said laterally separated rolling surfaces.

4. A deployment mechanism as in claim 3 in which said laterally separated rolling surfaces on each lower roller are integrally formed as part of a single roller.

5. A deployment mechanism as in claim 3 in which each lower roller comprises a pair of divided rollers, each having a said laterally spaced rolling surface thereon.

6. A deployment mechanism as in claim 1 in which said rack stands proud of at least one said roller track.

7. A deployment mechanism as in claim 1 wherein said auxiliary airfoil is a leading edge slat.

8. A deployment mechanism as in claim 1 wherein said support beam, during operation, remains within the main airfoil and any space between the main airfoil and the auxiliary airfoil.

* * * * *